United States Patent [19]
Bolli

[11] 3,982,381
[45] Sept. 28, 1976

[54] APPARATUS FOR TRANSVERSELY SEALING A WRAPPER HOSE

[75] Inventor: Hans-Ulrich Bolli, Schleitheim, Switzerland

[73] Assignee: SIG Schweizerische Industrie-Gesellschaft, Neuhausen am Rheinfall, Germany

[22] Filed: Feb. 4, 1976

[21] Appl. No.: 655,248

[30] Foreign Application Priority Data
Feb. 4, 1975 Switzerland.......................... 1323/75

[52] U.S. Cl............................... 53/180 R; 156/583
[51] Int. Cl.².......................................... B65B 51/16
[58] Field of Search ...................... 53/180 R, 182 R; 156/582, 583; 219/244

[56] References Cited
UNITED STATES PATENTS

| | | | |
|---|---|---|---|
| 3,108,034 | 10/1963 | Hannon | 156/582 |
| 3,522,135 | 7/1970 | Page | 53/182 R |
| 3,782,072 | 1/1974 | Sorensen et al. | 53/182 R |
| 3,850,780 | 11/1974 | Crawford et al. | 53/182 R |

FOREIGN PATENTS OR APPLICATIONS 1,274,832   5/1972   United Kingdom................... 53/180

Primary Examiner—Robert Louis Spruill
Attorney, Agent, or Firm—Spencer & Kaye

[57] ABSTRACT

An apparatus for periodically forming transverse seams in a longitudinally advanced wrapper hose for transversely sealing the wrapper hose between articles previously arranged therein, has cooperating rotary upper and lower sealing shoes between which the wrapper hose passes and which periodically pinch the wrapper hose walls together and transversely seal them to one another. There is further provided a flexible bar grate arranged to support the wrapper hose in the zone of the sealing shoes. The bar grate is formed of a plurality of parallel-spaced interconnected bars which include two end bars, each articulated to a connecting rod. The connecting rods, in turn, are articulated to one another by a joint pin. A drive arm is affixed to the shaft of the lower sealing shoe spaced from and aligned with the latter. The drive arm has a radial guide groove into which projects the joint pin of the connecting rods. The lower sealing shoe projects into the space between the two end bars. The bar grate is rotated — in synchronism with the lower sealing shoe — by the shaft of the lower sealing shoe through the drive arm, the joint pin and the connecting rods.

2 Claims, 3 Drawing Figures

APPARATUS FOR TRANSVERSELY SEALING A WRAPPER HOSE

BACKGROUND OF THE INVENTION

This invention relates to an apparatus for forming transverse seams in a wrapper hose made in a continuous package making machine and is, in uniform distances, filled with the articles or article groups to be packed. The wrapper hose is to be provided with longitudinally spaced transverse seams to obtain packages that can be severed from one another. The apparatus has two superposed, oppositely rotating sealing shoes which pinch the wrapper hose between two articles or two article groups and, at the same time, provide a transverse seam bonding the wrapper hose walls together.

An apparatus of the afore-outlined type is disclosed, for example, in Swiss Patent No. 374,587 which relates to continuous package making. In case a very thin sheet is used for the wrapper hose and the cross section of the hose is small and/or the articles to be packaged are of yielding consistency, the wrapper hose, in the zone of the sealing shoes, thus, for example, between a table at the input side and a conveyor at the output side, is not supported in a sufficiently firm manner and thus may bend through. This results in unsightly packages or even in operational malfunctions.

SUMMARY OF THE INVENTION

It is an object of the invention to provide an improved apparatus of the above-outlined type from which the discussed disadvantage is eliminated.

This object and others to become apparent as the specification progresses are accomplished by the invention, according to which, briefly stated, the apparatus has a flexible bar grate arranged to support the wrapper hose in the zone of the sealing shoes. The bar grate is formed of a plurality of parallel-spaced interconnected bars which include two end bars, each articulated to a connecting rod. The connecting rods, in turn, are articulated to one another by a joint pin. A drive arm is affixed to the shaft of the lower sealing shoe spaced from and aligned with the latter. The drive arm has a radial guide groove into which projects the joint pin of the connecting rods. The lower sealing shoe projects into the space between the two end bars. The bar grate is rotated — in synchronism with the lower sealing shoe — by the shaft of the lower sealing shoe through the drive arm, the joint pin and the connecting rods.

DESCRIPTION OF THE PREFERRED EMBODIMENT

Figure 1:
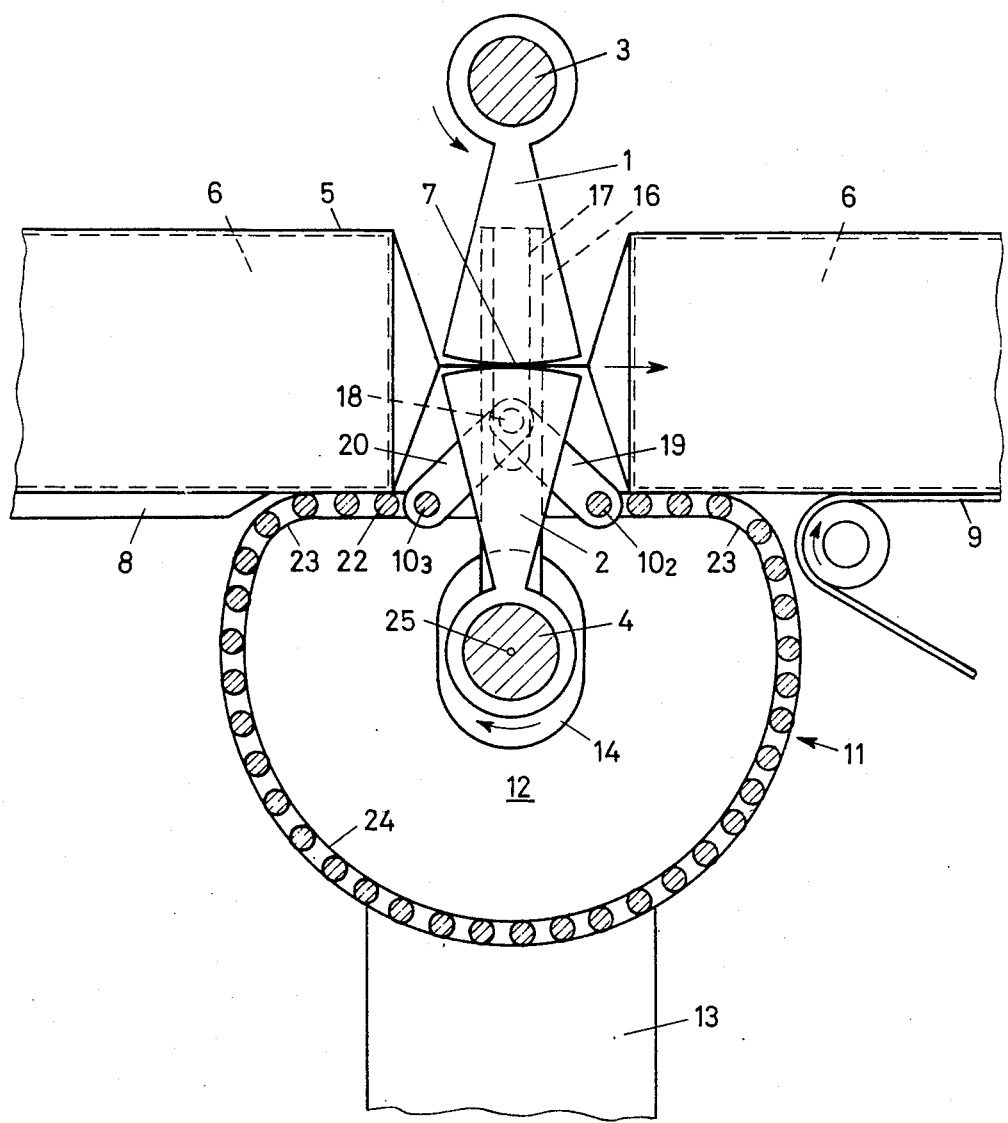
FIG. 1 is a schematic sectional side elevational view of a preferred embodiment of the invention.
Figure 2:
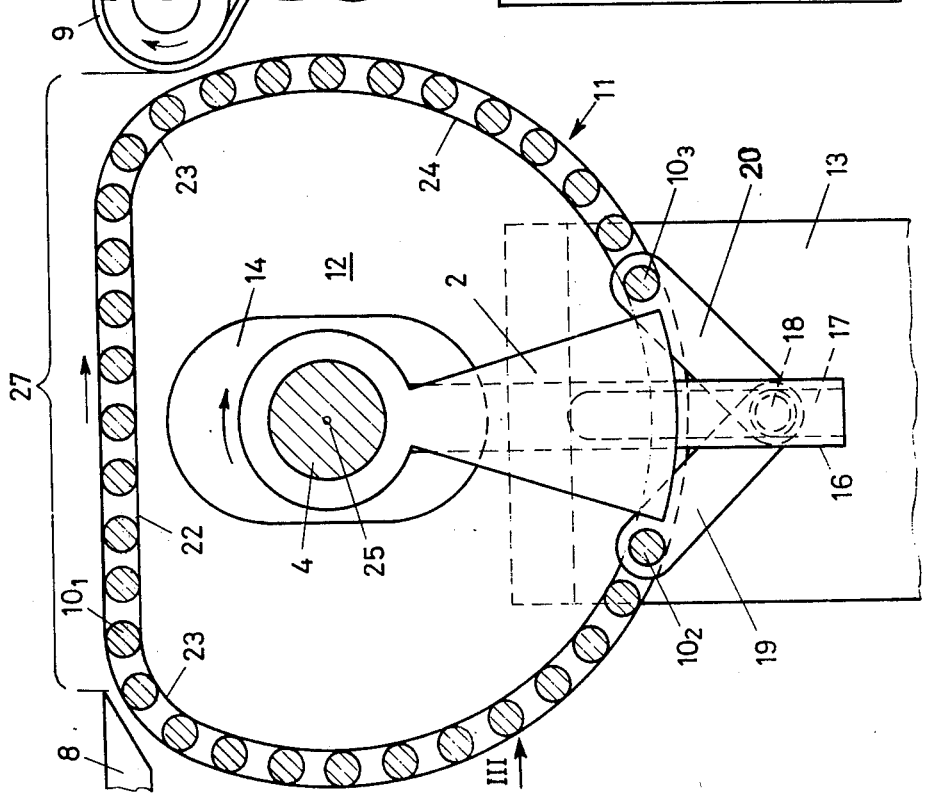
FIG. 2 is a schematic sectional side elevational view of the preferred embodiment on an enlarged scale and taken along line II—II of FIG. 3 and showing a component in a position different from that illustrated in FIG. 1.

Turning now to FIGS. 1 and 2, the transverse sealing apparatus comprises two sealing shoes 1 and 2 which are affixed to two parallel, superimposed, oppositely rotating, conventionally driven shafts 3 and 4, respectively. If the sealing shoes 1 and 2 are in their position as shown in FIG. 1, they pinch together a wrapper hose 5 which is formed in a conventional manner from a sealable wrapper foil. The pinched area of the wrapper hose is situated between two articles or two article groups 6 contained within the wrapper hose. As a result of the pinching operation, the upper and lower walls of the wrapper hose 5 are in a face-to-face, contacting relationship at 7 and are sealed together by the cooperating sealing shoes by means of a transverse seam. It is noted that the sealing shoes may be of the heated type to provide a seal by welding, or may be unheated to provide — if the proper wrapper material is used — a seal merely by application of pressure.

The wrapper hose 5, made in a folder box (not shown), is positioned, at the inlet side of the apparatus, on a table 8 and, on the outlet side of the apparatus, it is supported on a conveyor belt 9. It is to be understood that the table 8 and the belt 9 may be replaced by other conventional support and conveyor structures without affecting the structure and function of the invention now to be described.

Figure 3:
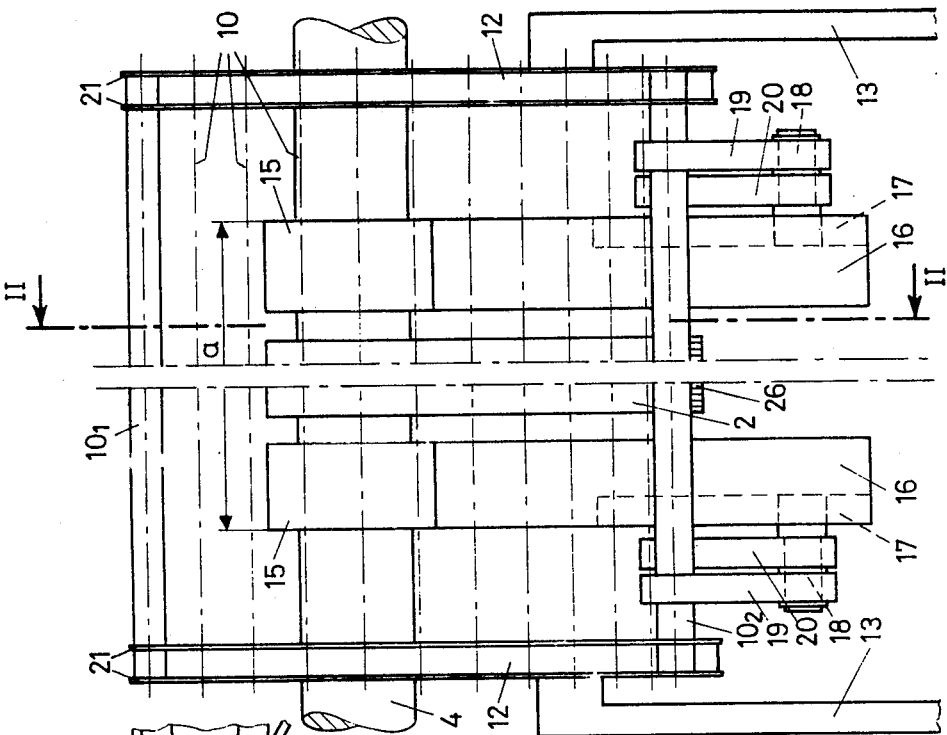
FIG. 3 is a schematic rear elevational view of the preferred embodiment as seen in the direction of arrow III of FIG. 2.

Also referring now to FIG. 3, between the table 8 and the conveyor belt 9 the wrapper hose 5 is positioned on a rotary grate 11 formed of parallel-spaced bars 10. The bars 10 are carried at their ends — which are expediently provided with rollers, not shown — by two endless link chains 21. Thus, the bar grate 11 is flexible as a whole. The link chains are guided by the periphery of two oppositely located identical plates 12 which are secured to two carriers 13 affixed to the machine frame. In FIG. 3, apart from the bars designated at $10_1$ and $10_2$, the other bars 10 are illustrated only symbolically by dash-dot lines showing the bar axes.

Hubs 15 of two drive arms 16 are secured to the shaft 4 which projects through a large opening 14 provided in each plate 12. Each drive arm 16 has, with respect to the shaft 4, a radial guide groove 17 in which there is guided, for radial sliding motion, a joint pin 18 articulated to two end bars $10_2$ and $10_3$ by means of two connecting rods 19 and 20, respectively. The periphery of the plates 12 has, at the top, a straight horizontal portion 22, the two ends of which are interconnected by a circular plate portion 24 with the interposition of rounded portions 23. The portion 24 extends through a central angle of over 180°. Upon rotation of the shaft 4 the chains 21, together with the bar grate 11, are rotated by the two arms 16, the joint pins 18 guided in the grooves 17 and the connecting rods 19, 20. The width of the table 8 and the conveyor belt 9 is smaller than the distance between the drive arms 16 to ensure that the latter have a free path of motion. During rotation of the drive arms 16, the varying distances between the circumference of the guide plates 12 and the axis 25 of the shaft 4 are equalized by means of the joint pins 18 which are slidably arranged in the grooves 17.

The drive arms 16 are aligned with the sealing shoe 2. The outer distance $a$ between the two drive arm hubs 15 (FIG. 3) corresponds to the width of the table 8 and the conveyor belt 9. The work faces of the sealing shoes 1 and 2 may be provided with shallow knurls as indicated at 26 for the shoe 2.

The guide plates 12 are arranged and dimensioned in such a manner that the gap 27 between the table 8 and the conveyor belt 9 is substantially filled by the upper, planar portion of the rotary bar grate 11 as long as the sealing shoe 2, projecting radially between the end bars 10₂ and 10₃ is located in the zone of the arcuate guide plate portion 24, as seen in FIG. 2. The space between the two end bars 10₂ and 10₃ is greater than the distance between any other two adjoining bars of the bar grate 11. The length of the gap 27 measured in the direction of wrapper hose feed is so dimensioned as to permit the sealing shoe 2, upon its rotation, to clear and project beyond the table 8 and the conveyor belt 9.

Were the rotary bar grate 11 absent, the wrapper hose 5 would not be supported along the gap 27 as long as the sealing shoe 2 has not entered into the gap 27. In case of yielding wrapper material and articles as well as in case of a small hose height the earlier-mentioned deformation of the wrapper hose 5 would result. This phenomenon would be particularly disadvantageous if the sealing shoes 1 and 2, in a known manner, serve not only to form the transverse seam, but also were provided with a transversely extending knife for severing the wrapper hose transversely for separating two successive packages from one another. It is seen in FIG. 1 that only a relatively small wrapper hose portion remains unsupported on the rotary grate 11 between the end bars 10₂ and 10₃. This small wrapper hose portion, however, is supported by the sealing shoe 2 itself.

The speeds of the oppositely rotating shafts 3 and 4 are identical, but in most cases not uniform, since during seam formation they are advantageously somewhat less than the average speed. Such a lagging motion of the sealing shoes is well known.

It will be understood that the above description of the present invention is susceptible to various modifications, changes and adaptations, and the same are intended to be comprehended within the meaning and range of equivalents of the appended claims.

What is claimed is:

1. In an apparatus for periodically forming transverse seams in a longitudinally advanced wrapper hose for transversely sealing the wrapper hose between articles previously arranged therein, the apparatus including cooperating rotary upper and lower sealing shoes between which the wrapper hose passes and which periodically pinch the wrapper hose walls together and transversely seal them to one another; the lower sealing shoe being affixed to a rotary shaft; the improvement comprising a. a drive arm affixed to said shaft spaced from said lower sealing shoe and being in alignment therewith;
   b. means defining a radially extending guide groove in said drive arm;
   c. two connecting rods jointed to one another by a joint pin extending into said groove and being radially slidable therein; and
   d. a flexible bar grate arranged to support the wrapper hose in the zone of said sealing shoes and formed of a plurality of parallel-spaced, interconnected bars; two of said bars constituting end bars articulated to the one and the other connecting rod; the space between the two end bars being greater than the space between any other two bars; said lower sealing shoe projecting into the space between said end bars; said bar grate being rotated by said shaft through said drive arm, said joint pin and said connecting rods in synchronism with said lower sealing shoe.

2. An apparatus as defined in claim 1, further comprising two stationary guide plates supported parallel-spaced from one another and each having a periphery on which opposite ends of said bars of said bar grate are guided; said periphery including an upper, linear portion having opposite ends and a lower, arcuate portion connecting said opposite ends.

* * * * *

UNITED STATES PATENT AND TRADEMARK OFFICE
CERTIFICATE OF CORRECTION

PATENT NO. : 3,982,381
DATED : September 28th, 1976
INVENTOR(S) : Hans-Ulrich Bolli It is certified that error appears in the above—identified patent and that said Letters Patent are hereby corrected as shown below:

In the heading of the patent, under [73] Assignee, change "Germany" to --Switzerland--.

*Signed and Sealed this*

Twenty-second Day of March 19

[SEAL]

Attest:

RUTH C. MASON
*Attesting Officer*

C. MARSHALL DANN
*Commissioner of Patents and Trademarks*